(12) United States Patent
Eisman et al.

(10) Patent No.: US 6,280,870 B1
(45) Date of Patent: Aug. 28, 2001

(54) COMBINED FUEL CELL FLOW PLATE AND GAS DIFFUSION LAYER

(75) Inventors: Glenn A. Eisman, Niskayuna; William B. Maynard, Voorheesville; Ron H. Farkash, Clifton Park; Charles M. Carlstrom, Saratoga Springs, all of NY (US)

(73) Assignee: Plug Power Inc., Latham, NY (US)

(*) Notice: Subject to any disclaimer, the term of this patent is extended or adjusted under 35 U.S.C. 154(b) by 0 days.

(21) Appl. No.: 09/383,466

(22) Filed: Aug. 26, 1999

(51) Int. Cl.[7] ................................................ H01M 2/00
(52) U.S. Cl. .......................... 429/34; 429/38; 429/39; 429/12; 429/30; 29/623.1
(58) Field of Search ........................... 429/34, 30, 38, 429/39, 12; 29/623.1

(56) References Cited

U.S. PATENT DOCUMENTS

| 5,252,410 | 10/1993 | Wilkinson et al. |
| 5,264,299 | 11/1993 | Krasij et al. |
| 5,292,600 | 3/1994 | Kaufman |
| 5,300,370 | 4/1994 | Washington et al. |
| 5,523,175 | 6/1996 | Beal et al. |
| 5,534,362 | 7/1996 | Okamoto et al. |
| 5,736,269 | 4/1998 | Okamoto et al. |
| 5,840,414 | 11/1998 | Bett et al. |
| 5,853,909 | 12/1998 | Reiser |
| 6,015,633 | * 1/2000 | Carlstrom, Jr. et al. ............. 429/13 |
| 6,127,058 | * 10/2000 | Pratt et al. ........................... 429/30 |

* cited by examiner

Primary Examiner—Gabrielle Brouillette
Assistant Examiner—Angela J. Martin
(74) Attorney, Agent, or Firm—Trop, Pruner & Hu, P.C.

(57) ABSTRACT

A gas diffusion layer that is usable with a fuel cell includes a material that is adapted to permit a reactant of the fuel cell to diffuse through the material. The material includes flow channels for communicating the reactant so that at least a portion of the reactant diffuses through the material to a membrane of a fuel cell. The gas diffusion layer may be received by a recessed portion of a plate.

31 Claims, 8 Drawing Sheets

COMBINED FUEL CELL FLOW PLATE AND GAS DIFFUSION LAYER

BACKGROUND

The invention generally relates to the overall construction and configuration of a proton exchange membrane fuel cell, and more particularly, the invention relates to a combined fuel cell flow plate and gas diffusion layer.

A fuel cell is an electrochemical device that converts chemical energy produced by a reaction directly into electrical energy. For example, one type of fuel cell includes a proton exchange membrane (PEM), a membrane that may permit only protons to pass between an anode and a cathode of the fuel cell. At the anode, diatomic hydrogen (a fuel) is oxidized to produce hydrogen protons that pass through the PEM. The electrons produced by this oxidation travel through circuitry that is external to the fuel cell to form an electrical current. At the cathode, oxygen is reduced and reacts with the hydrogen protons to form water. The anodic and cathodic reactions may be described by the following equations:

$H_2 \rightarrow 2H^+ + 2e^-$ at the anode of the cell, and $O_2 + 4H^+ + 4e^- \rightarrow 2H_2O$ at the cathode of the cell.

Because a single fuel cell typically produces a relatively small voltage (around 1 volt, for example), several serially connected fuel cells may be formed out of an arrangement called a fuel cell stack to produce a higher voltage. The fuel cell stack may include different plates that are stacked one on top of the other in the appropriate order, and each plate may be associated with more than one fuel cell of the stack. The plates may be made from a graphite composite material or metal and may include various channels and orifices to, as examples, route the above-described reactants and products through the fuel cell stack. Several PEMs (each one being associated with a particular fuel cell) may be dispersed throughout the stack between the anodes and cathodes of the different fuel cells. In addition to the membrane, a catalyst and gas diffusion layer are sandwiched between the anode and cathode plates. The catalyst layer may be placed on the membrane or on the gas diffusion layer. The gas diffusion layer may be made out of an electrically conductive and porous diffusion material, such as a carbon cloth or paper material, for example.

Figure 1:
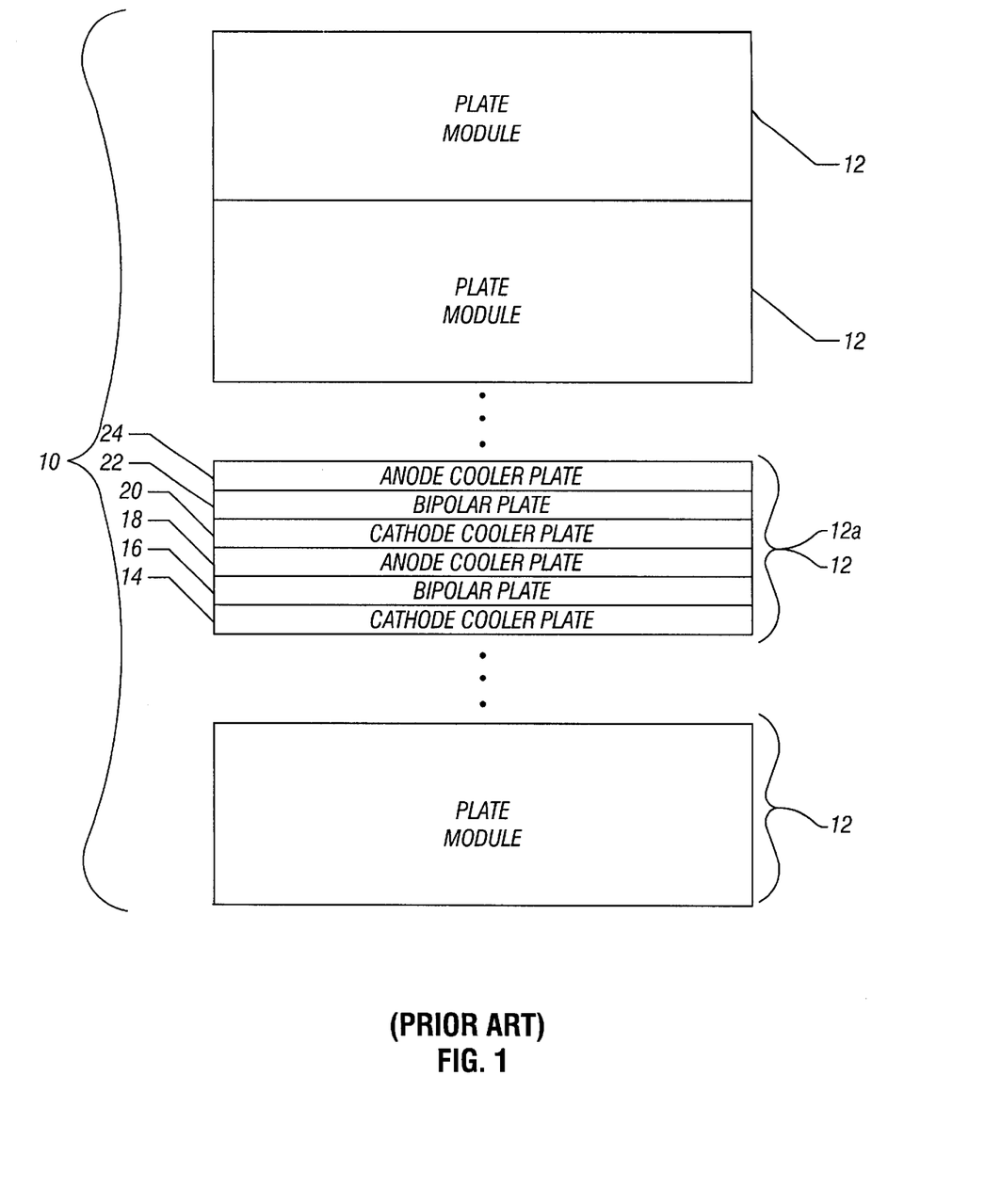
FIG. 1 is a side view of a fuel cell stack according to the prior art.

Referring to FIG. 1, as an example, a fuel cell stack 10 may be formed out of repeating units called plate modules 12. In this manner, each plate module 12 includes a set of plates that may form several fuel cells. For example, for the arrangement depicted in FIG. 1, an exemplary plate module 12a may be formed from a cathode cooler plate 14, a bipolar plate 16, a cathode cooler plate 18, an anode cooler plate 20, a bipolar plate 22 and an anode cooler plate 24 that are stacked from bottom to top in the listed order. The cooler plate functions as a heat exchanger by communicating a coolant through coolant flow channels that are formed in either the upper or lower surface of the cooler plate to remove heat from the plate module 12a. The surface of the cooler plate that is not used to route the coolant includes flow channels to route either hydrogen (for the anode cooler plates 18 and 24) or oxygen (for the cathode cooler plates 14 and 20) to an associated fuel cell. The bipolar plates 16 and 22 include flow channels on one surface to route hydrogen to an associated fuel cell and flow channels on the opposing surface to route oxygen to another associated fuel cell. Due to this arrangement, each fuel cell may be formed in part from one bipolar plate and one cooler plate, as an example.

For example, one fuel cell of the plate module 12a may include an anode-membrane-ecathode sandwich, called a membrane-electrode-assembly (MEA), that is located between the anode cooler plate 24 and the bipolar plate 22. In this manner, the upper surface of the bipolar plate 22 includes flow channels to route oxygen near the cathode of the MEA, and the lower surface of the anode cooler plate 24 includes flow channels to route hydrogen near the anode of the MEA.

As another example, another fuel cell of the plate module 12a may be formed from another MEA that is located between the bipolar plate 22 and the cathode cooler plate 20. The lower surface of the bipolar plate 22 includes flow channels to route hydrogen near the anode of the MEA, and the upper surface of the cathode cooler plate 24 includes flow channels to route oxygen near the cathode of the MEA. The other fuel cells of the plate module 12a may be formed in a similar manner.

In order to manufacture the fuel cell stack in a cost effective manner, the time that is required to assemble the stack needs to be minimized. One way to accomplish this is to minimize the number of components that are handled in the assembly of the stack.

SUMMARY

The components that are used to assemble a fuel cell stack may be reduced by creating flow channels in gas diffusion layers of the stack. In this manner, in an embodiment of the invention, a gas diffusion layer that is usable with a fuel cell includes a material that is adapted to permit a reactant of the fuel cell to diffuse through the material. The material includes flow channels for communicating the reactant so that at least a portion of the reactant diffuses through the material to a membrane of a fuel cell. In some embodiments, the gas diffusion layer may be received by a plate, and the plate may be stacked with other plates to form the fuel cell stack. Advantages of the present invention may include, for example, decreasing the number and cost of parts and materials required to manufacture a fuel cell stack. Other advantages may include increased structural integrity of a fuel cell stack, and increased fuel cell performance. It will be appreciated that in embodiments where a planer surface of the combined flow plate and gas diffusion layer contacts the membrane electrode assembly (as opposed to such contact being limited to contact along flow plate lands), still other advantages may include providing continuous support of the fuel cell membrane electrode assembly, homogenized diffusion, permeability, and electrical contact between the membrane electrode assembly and the combined flow plate and gas diffusion layer, and reducing the amount of stack compression needed for satisfactory electrical conductivity between the membrane electrode assembly and the combined flow plate and gas diffusion layer.

Advantages and other features of the invention will become apparent from the following description, from the drawing and from the claims.

DETAILED DESCRIPTION

Figure 2:
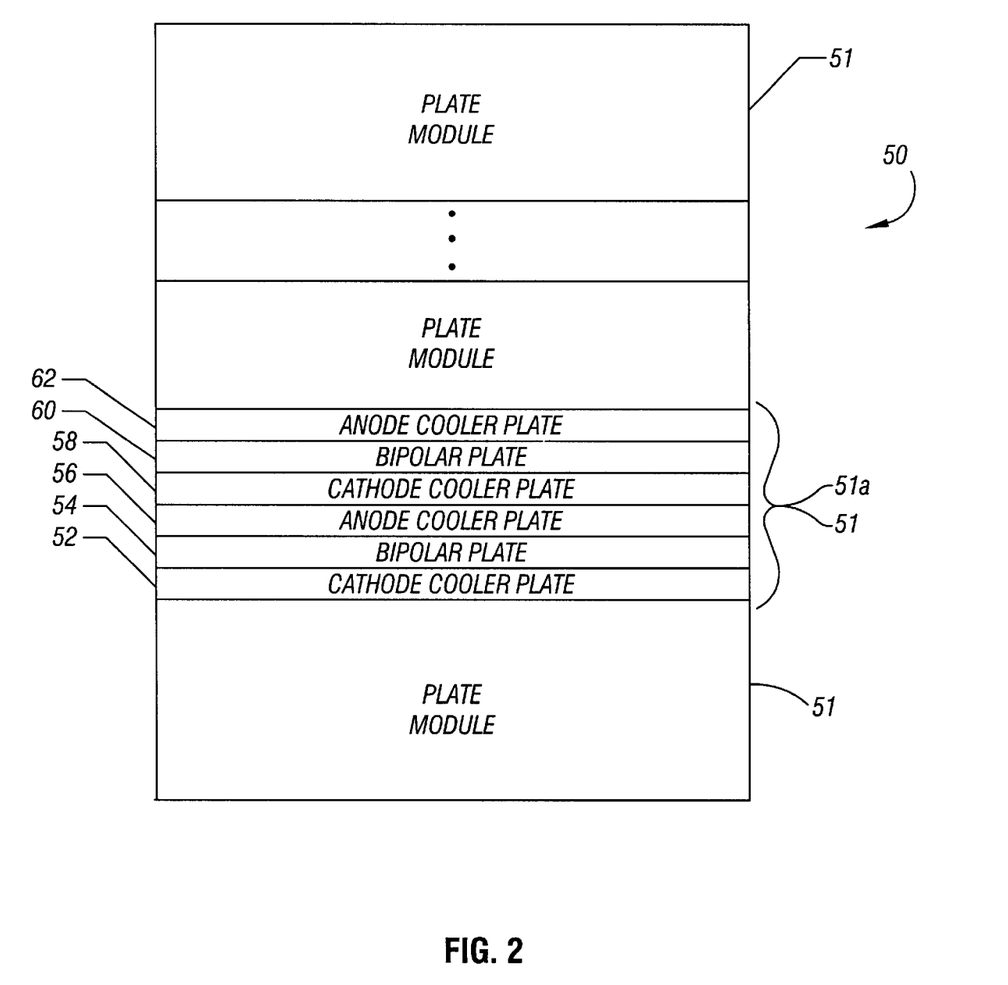
FIG. 2 is a side view of a fuel cell stack according to an embodiment of the invention.

Referring to FIG. 2, an embodiment 50 of a fuel cell stack in accordance with the invention includes gas diffusion layers that each have built-in flow channels to communicate reactants to membranes (proton exchange membranes (PEMs), for example) of the stack 50. Because flow channels are formed in the gas diffusion layers, reactant flow channels do not need to be formed in flow plates (graphite composite or metal flow plates, for example) of the fuel cell stack 50. Thus, due to this technique, the gas diffusion layers and flow plates are combined into plate assemblies (described below) that may reduce assembly time of the stack 50 and thus, may reduce the cost of manufacturing the fuel cell stack 50.

More specifically, the fuel cell stack 50 may be formed from repeating units called plate modules 51. A side view of an exemplary plate module 51a (having a design similar to the other plate modules 51) is depicted in FIG. 2. The plate module 51a includes flow plates that serve as electrically conductive frames to hold the gas diffusion layers. In this manner, each gas diffusion layer is electrically conductive, diffuses a fuel cell reactant to an associated membrane and supports the associated fuel cell membrane. As an example, in some embodiments, the plate module 51a may include the following flow plates to form four fuel cells: bipolar plates 54 and 60; cathode cooler plates 52 and 58; and anode cooler plates 56 and 62.

Figure 3:
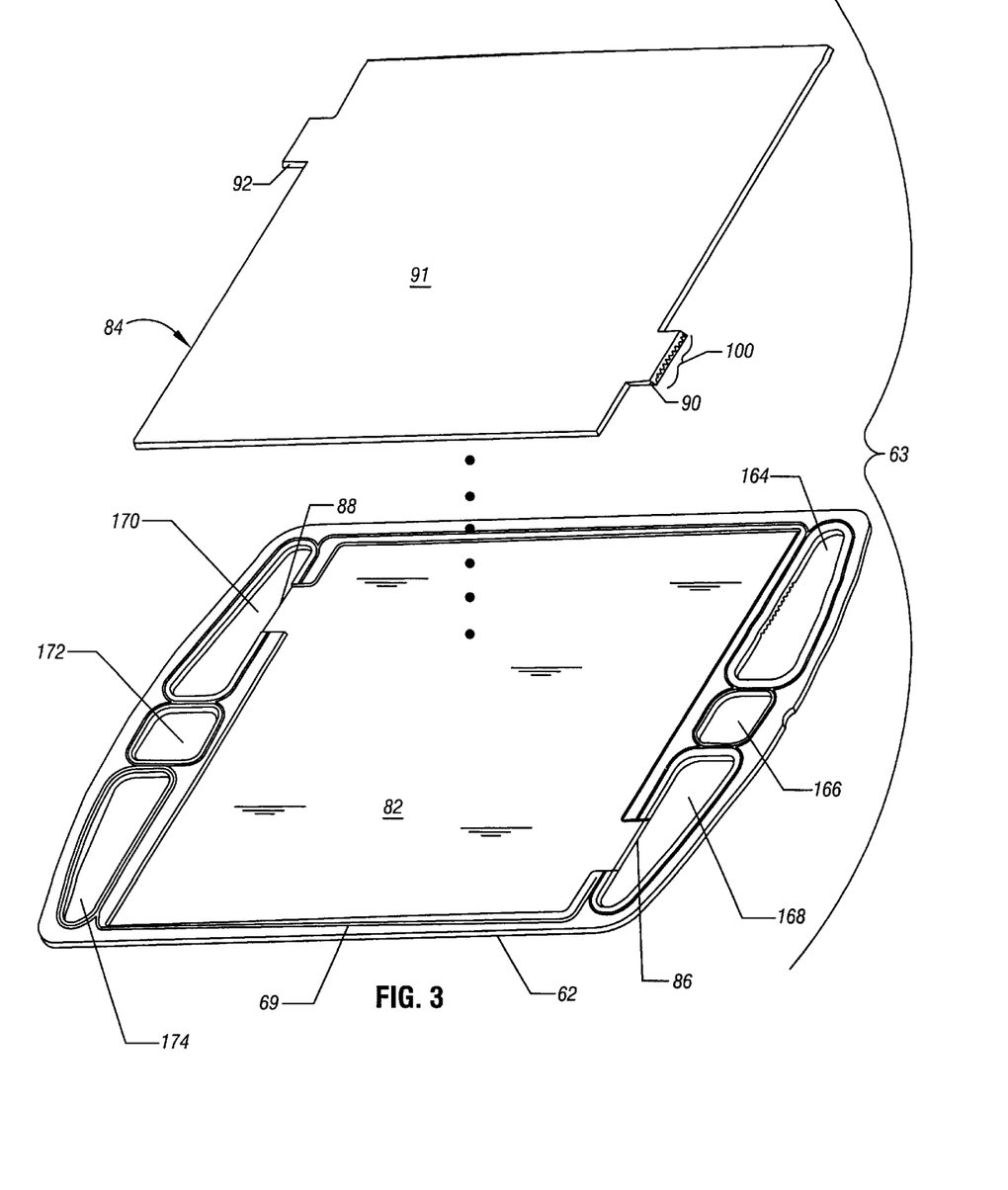
FIG. 3 is an exploded bottom up perspective view of an anode cooler plate assembly of the fuel cell stack of FIG. 2 according to an embodiment of the invention.

FIG. 3 depicts a bottom up exploded perspective view of an anode cooler plate assembly 63 that is formed from the anode cooler plate 62 and an inset gas diffusion layer 84. The plate 62 includes openings that align with corresponding openings of other flow plates of the stack 50 to form a manifold for communicating the reactants and a coolant. In this manner, the plate 62 may include an opening 170 that forms part of a vertical inlet manifold passageway of the manifold for the hydrogen, and the plate 62 may include an opening 168 that forms part of a vertical outlet passageway of the manifold for the hydrogen. Similarly, openings 174 and 164 in the plate 62 may form vertical inlet and outlet passageways, respectively, of the manifold for communicating air (to furnish oxygen to the fuel cells); and the plate 62 may include openings 172 and 166, respectively, to partially form vertical inlet and outlet passageways of the manifold for communicating the coolant.

Figure 4:
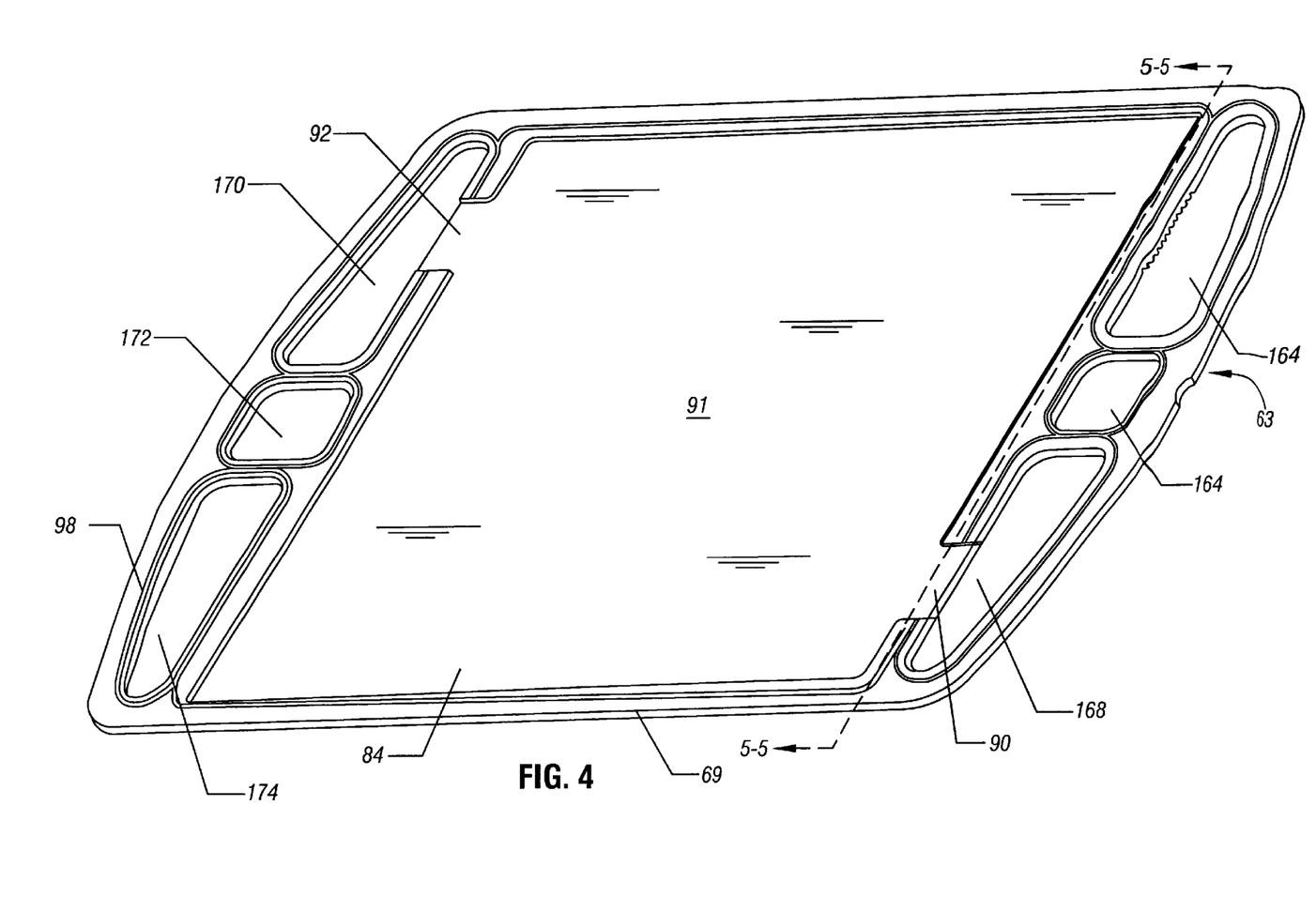
FIG. 4 is a bottom up perspective view of the anode cooler plate assembly of FIG. 3.

The anode cooler plate 62 may include a generally rectangular recessed portion 82 for receiving the inset gas diffusion layer 84. In this manner, the gas diffusion layer 84 may be placed in the recessed portion 82 so that a top surface 91 of the gas diffusion layer 84 is generally flush with a rim 69 of the anode cooler plate 62 that circumscribes the recessed portion 82, as depicted in FIG. 4. Inlet 92 and outlet 90 extensions of the gas diffusion layer 84 include inlet and outlet flow channel ports, respectively, that include flow channels to establish communication between the flow channels of the gas diffusion layer 84 and the hydrogen manifold passageways. The inlet 92 and outlet 90 extensions may rest in corresponding channels 88 and 86, respectively, that are formed in the anode cooler plate 62, as depicted in FIG. 4. For example, each channel 86, 88 may be formed by the absence of a section of the rim 69.

Figure 5:
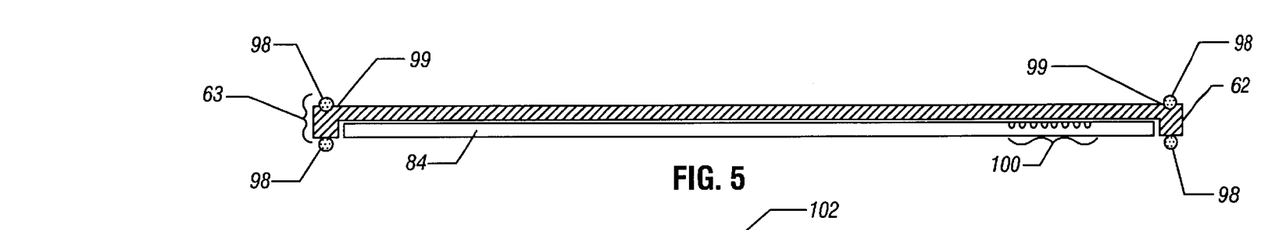
FIG. 5 is a cross-sectional view of the anode cooler plate assembly taken along line 5—5 of FIG. 4.

Referring to FIG. 5, the upper surface of the anode cooler plate 62 may include a gasket groove 99 to receive a gasket 98 that seals the various reactant and coolant regions that are formed by the anode cooler plate 62 and the gas diffusion layer 84. Also shown in FIGS. 3, 4 and 5 is another gasket 98 that contacts the lower surface of the anode plate 62 and resides in a corresponding gasket groove that is formed in the bipolar plate 60 (see FIG. 2).

Figure 6:
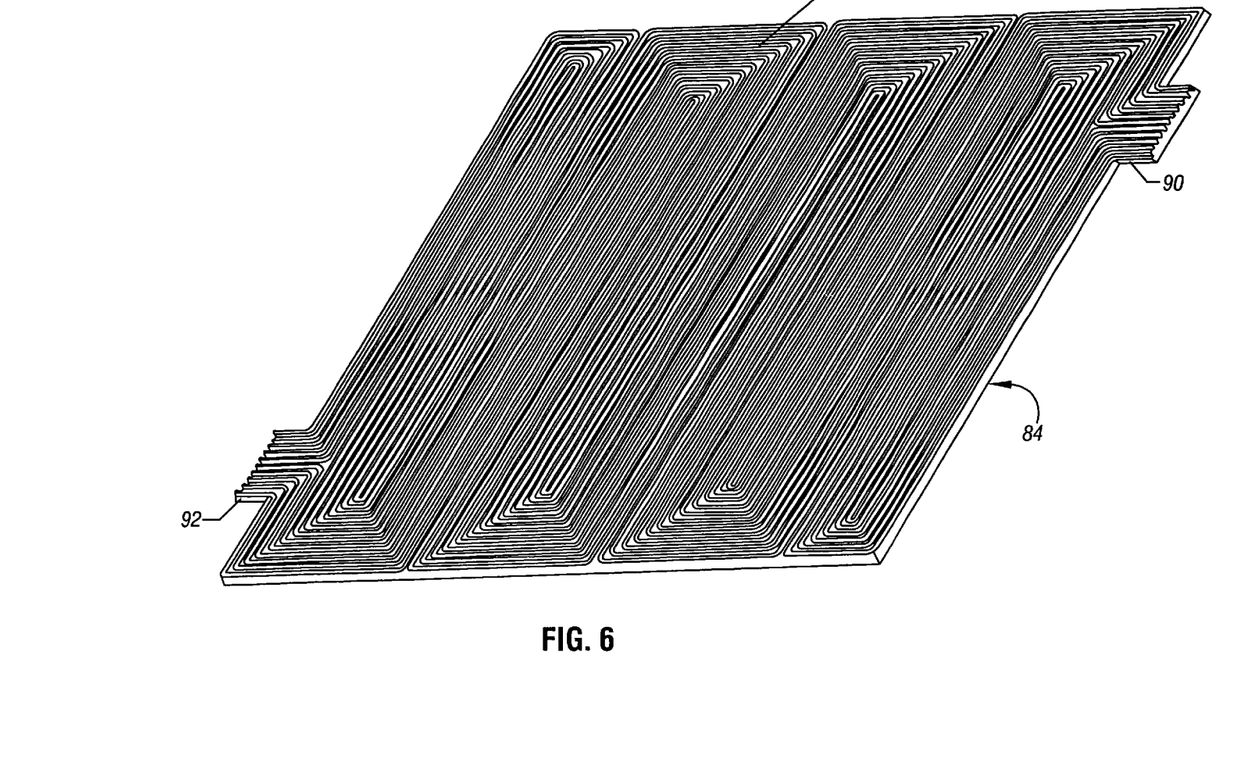
FIG. 6 is a bottom view of a gas diffusion layer of the anode cooler plate assembly according to an embodiment of the invention.

Referring to FIG. 6, the upper surface (that contacts the surface 91 of the plate 62) of the gas diffusion layer 84 includes flow channels 102 to communicate hydrogen from the opening 170 of the hydrogen manifold passageway to the opening 168 of the hydrogen outlet manifold passageway. Thus, due to the above-described arrangement, the flow channels 102 in combination with the adjacent surface 91 of the plate 62 form closed flow serpentine conduits for communicating a hydrogen flow. Hydrogen from the flow diffuses through the lower surface 91 (see FIG. 4) of the gas diffusion layer 84 to contact a membrane, such as a proton exchange membrane (PEM), that is located below the gas diffusion layer 84. While serpentine channels are shown in FIG. 6 as an illustration, the present invention is not limited to serpentine flow channels. Embodiments of the present invention may also include, for example, non-serpentine channels, channels that are discontinuous (e.g., branching into additional channels), and any other suitable channel configurations.

Figure 9:
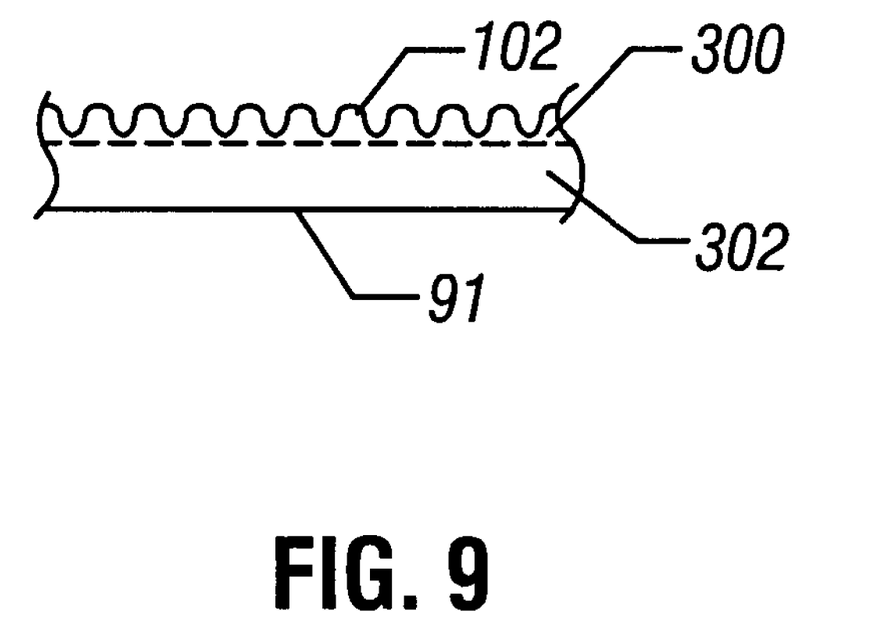
FIG. 9 is a cross-sectional view of a portion of a gas diffusion layer according to an embodiment of the invention.

The fuel cell reaction produces water near the membrane. For purposes of preventing this water from collecting in the gas diffusion layer 84, the gas diffusion layer 84 may include a wet proofing agent, or other agents that may promote water diffusion to prevent water collection. For example, a cross-sectional portion 290 of the gas diffusion layer 84 is depicted in FIG. 9. As shown, the gas diffusion layer 84 includes a diffuser body 302 and an upper region 300 in which the flow channels 102 are formed. In some embodiments, a hydrophobic material (Teflon®, for example) may be deposited in the diffuser body 302 to prevent water from collecting in the diffuser body 302. In some embodiments, fluorinated carbon particles may be deposited on the surface 91 to prevent migration of the water.

In some embodiments, the gas diffusion layer 84 may be formed by injection molding or other molding techniques known in the art. For example the gas diffusion layer 84 may be formed of a powdered metal material with a thermally or chemically removable binder material. For example, a wax binding material may be removed and the remaining structure sintered to form a porous metal gas diffusion layer substrate. Other molding techniques may allow formation of the gas diffusion layer 84, for example, by simple compression of a metal or carbon based powder. Other materials and techniques are possible.

Figure 7:
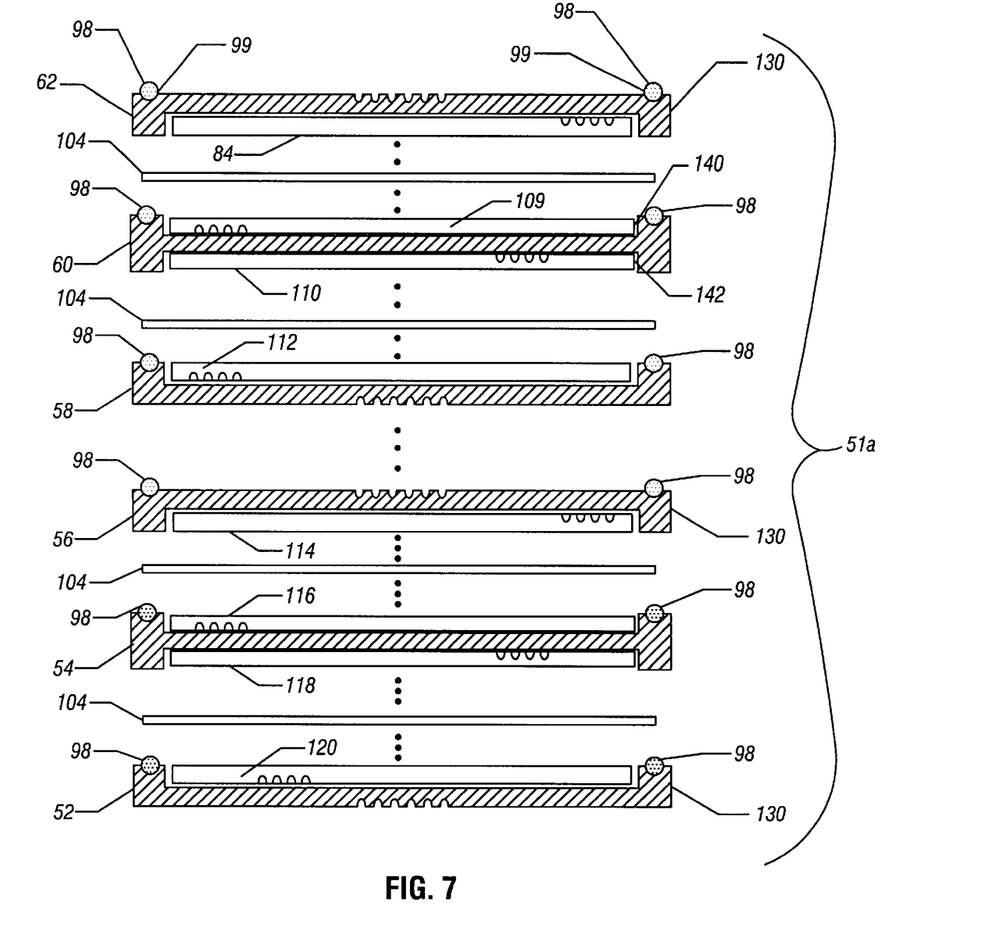
FIG. 7 is a more detailed exploded cross-sectional view of a plate module of the fuel cell stack of FIG. 2 according to an embodiment of the invention.

The gas diffusion layer may also be used to communicate air flows. For example, the plate module 51a (as well as the entire stack 50) may include gas diffusion layers that include flow channels for communicating air and gas diffusion layers that include flow channels for communicating oxygen. For example, FIG. 7 depicts a more detailed cross-sectional view of the plate module 51a taken along the same cross-sectional slice as the cross-sectional view of the anode cooler plate 62 that is depicted in FIG. 5. As shown, the bipolar plate 60 may include an upper surface recessed region 140 for receiving an inset gas diffusion layer 109. The gas diffusion layer 109, in turn, includes flow channels for communicating an air flow to cause oxygen (from the air flow) to diffuse through the gas diffusion layer 109 to an upper membrane 104. The bipolar plate 60 may also include a lower surface recessed region 142 for receiving a gas diffusion layer 110. The gas diffusion layer 110, in turn, includes flow channels for communicating hydrogen to cause the hydrogen to diffuse through the gas diffusion layer 110 to a lower membrane 106. It will be appreciated that, while members 109 and 110, for example, are generally referred to as gas diffusion layers, they might also be referred to as porous flow plates, such that designs under the present invention could be referred to as being without gas diffusion layers. In fact, members 109 and 110 are combined flow plates and gas diffusion layers. The scope of the present invention is not limited by arbitrary designations of such terms as they might be construed with respect to the prior art. Rather, for purposes of the present invention, the relative meaning of traditional terms such as flow plates and gas diffusion layers should be taken in the context of the true spirit of the claims of the present invention.

Similarly, the cathode cooler plate 58 includes an inset gas diffusion layer 112, the anode cooler plate 56 includes an inset gas diffusion layer 114, the bipolar plate 54 includes an inset gas diffusion layer 118, and the cathode cooler plate 58 includes an inset gas diffusion layer 120. Similar to the gas diffusion layers 84, 109 and 110, the gas diffusion layers 112, 114, 116, 118 and 120 include reactant flow channels.

Thus, as depicted in FIG. 7, in some embodiments, three basic plates may be used to form the stack 50. In this manner, each bipolar plate (such as the bipolar plates 54 and 60) may be identical. In this manner, each bipolar plate may receive and support an upper air diffusion layer that diffuses oxygen to an upper membrane, and each bipolar plate may receive and support a lower gas diffusion layer that diffuses hydrogen to a lower membrane. Each anode cooler plate (anode cooler plates 56 and 62) may also be identical. In this manner, each anode cooler plate receives and supports a hydrogen diffusion layer. A gasket groove may be formed in the upper surface of the anode cooler plate. Similarly, each cathode cooler plate (cathode cooler plates 54 and 58) may also be identical. In this manner, cathode cooler plate receives and supports an oxygen diffusion layer. A gasket groove may be formed in the upper surface of the cathode cooler plate. As depicted in FIG. 7, the cathode cooler plate may be similar in design to the anode plate except for the placement of the gasket groove. Other arrangements are possible.

Figure 8:
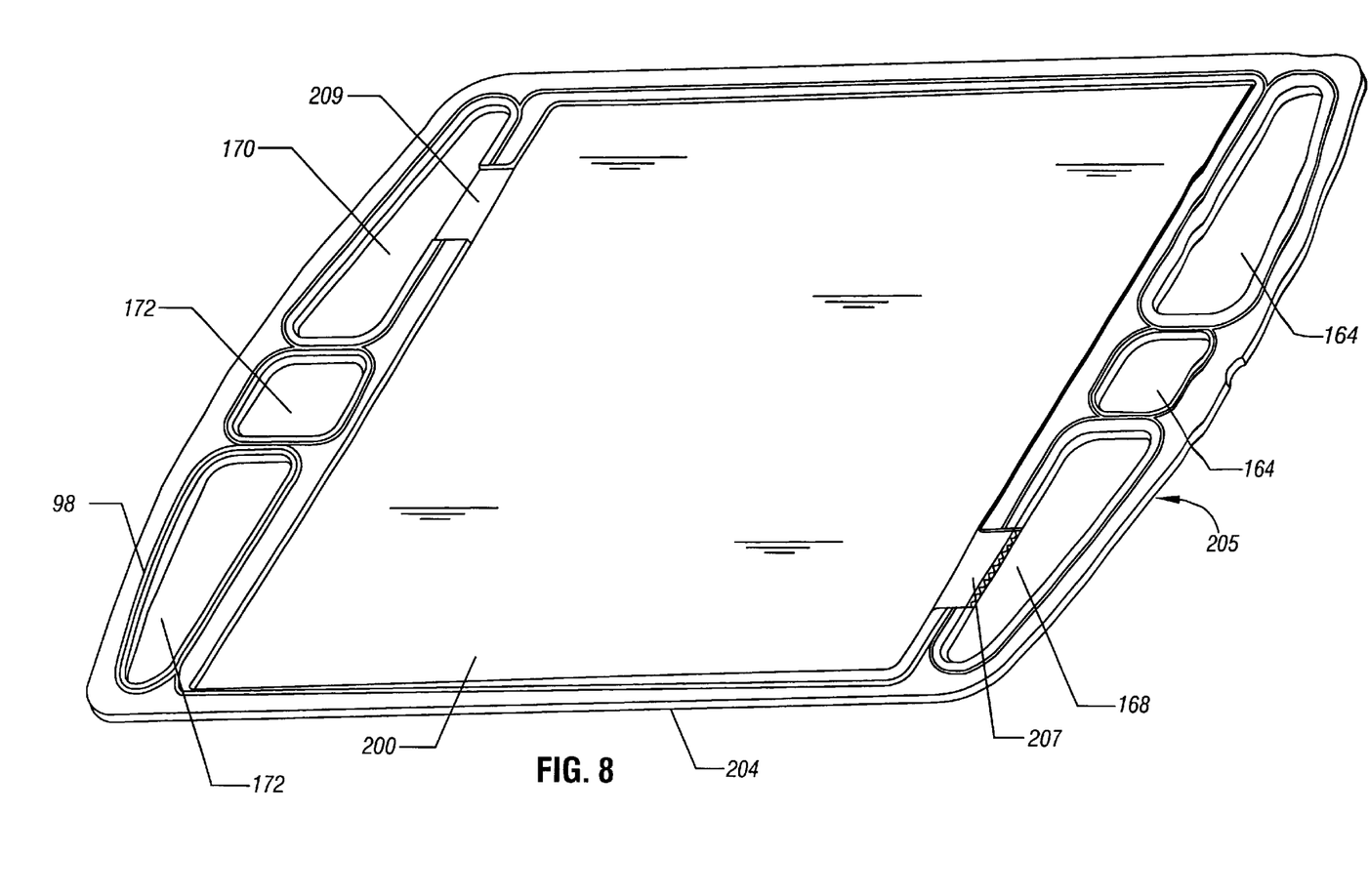
FIG. 8 is a bottom up perspective view of an anode cooler plate assembly according to an embodiment of the invention.

Other embodiments are within the scope of the following claims. For example, an alternative anode cooler plate assembly 205 is depicted in FIG. 8. The assembly 205 includes an anode cooler plate 204 that receives an inset gas diffusion layer 200 that has built-in flow channels. Unlike the anode cooler plate 62, the plate 205 has built in extensions 209 and outlet 207 for communicating hydrogen between the flow channels of the gas diffusion layer 200 as the hydrogen manifold passageways.

As another example, other layers besides the gas diffusion layers may be placed in the recessed portions of the plates. Thus, layers that enhance performance aspects of the fuel cells may be used. For example, a layer may be used to control the effective pore size through which reactant gasses must diffuse. A layer may also be used to enhance the electrical contact between the gas diffusion layer and the plate. A layer may also be used to inhibit water collection in the gas diffusion layer, such as by using a hydrophobizing agent or by other methods known in the art. The gas diffusion layer may itself receive various coatings or treatments to promote performance objectives including those described above. A catalyst layer may be bonded either to the membrane or to the gas diffusion layer. Other layers or combinations of layers are possible. As yet another example of an embodiment of the invention, the membrane may be bonded between two gas diffusion layers.

In the preceding description, directional terms, such as "upper," "lower," etc. may have been used for reasons of convenience to describe the fuel cell stack and its associated components. However, such orientations are not needed to practice the invention, and thus, other orientations are possible in other embodiments of the invention. For example, the fuel cell stack 50 and its associated components, in some embodiments, may be tilted by 90°.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. An assembly comprising:
   a gas diffusion layer comprising a diffuser body that includes flow channels formed in a surface of the body for communicating a reactant so that at least a portion of the reactant diffuses through the gas diffusion layer to a membrane of a fuel cell; and
   a plate including a recessed portion for receiving the gas diffusion layer.

2. The assembly of claim 1, wherein the gas diffusion layer includes a first surface and a second surface, wherein the first surface is adapted to deliver the reactant to the membrane and the flow channels are formed in the second surface.

3. The assembly of claim 1, wherein the plate includes additional flow channels to communicate the reactant between manifold passageways and the first flow channels.

4. The assembly of claim 1, wherein the plate does not include additional flow channels to communicate the reactant between manifold passageways and the first flow channels.

5. The assembly of claim 1, wherein the gas diffusion layer comprises:
   a diffuser block for diffusing the reactant to a first surface of the gas diffusion layer; and
   a second region integral with the diffuser block, the second region including the flow channels.

6. The assembly of claim 1, wherein the flow channels comprises serpentine flow channels.

7. The assembly of claim 1, wherein the flow channels establish communication between inlet and outlet passageways for the fluid in a fuel cell stack.

8. The assembly of claim 1, wherein the plate includes a rim around the recessed portion, and a surface of the gas diffusion layer is approximately flush with the rim.

9. The assembly of claim 1, wherein the gas diffusion layer includes a wet proofing agent to inhibit the collection of water in the gas diffusion layer.

10. The assembly of claim 9, wherein the wet proofing agent comprises a hydrophobic material.

11. The assembly of claim 1, wherein the gas diffusion layer is formed from a powdered metal material.

12. The assembly of claim 1, wherein the gas diffusion layer is formed from a carbon based material.

13. The assembly of claim 1, further comprising:
another gas diffusion layer including flow channels for communicating another reactant so that at least a portion of said another reactant diffuses through another gas diffusion layer to another membrane of another fuel cell,
wherein the plate further includes another recessed region for receiving said another gas diffusion layer.

14. A fuel cell comprising:
a membrane;
a first gas diffusion layer comprising a diffuser body that includes flow channels formed in a surface of the body for communicating hydrogen so that at least some of the hydrogen diffuses through the first gas diffusion layer to the membrane;
a first plate including a recessed portion for receiving the first gas diffusion layer;
a second gas diffusion layer comprising a diffuser body that includes flow channels communicating oxygen so some that at least some of the oxygen diffuses through the second gas diffusion layer to the membrane; and
a second plate including a recessed portion for receiving the second gas diffusion layer.

15. The fuel cell of claim 14, wherein at least one of the first and second gas diffusion layers includes a first surface and a second surface, wherein the first surface is adapted to deliver the reactant to the membrane and the flow channels are formed in the second surface.

16. The fuel cell of claim 14, wherein the membrane comprises a proton exchange membrane.

17. The fuel cell of claim 14, wherein at least one of the first and second plates includes a rim around the recessed portion, and a surface of the gas diffusion layer is approximately flush with the rim.

18. The fuel cell of claim 14, wherein the flow channels of the first and second gas diffusion layers comprise serpentine flow channels.

19. A gas diffusion layer usable with a fuel cell, comprising:
a material adapted to permit a reactant of the fuel cell to diffuse through the material, wherein the material includes flow channels for communicating the reactant so that at least a portion of the reactant diffuses through the material to a membrane of a fuel cell.

20. The gas diffusion layer of claim 19, wherein the gas diffusion layer includes a wet proofing agent to inhibit the collection of water in the gas diffusion layer.

21. The gas diffusion layer of claim 19, wherein the wet proofing agent comprises a hydrophobic material.

22. The gas diffusion layer of claim 19, wherein the gas diffusion layer is formed from a powdered metal material.

23. The gas diffusion layer of claim 19, wherein the gas diffusion layer is formed from a carbon based material.

24. The gas diffusion layer of claim 19, wherein the flow channels comprise serpentine flow channels.

25. The gas diffusion layer of claim 19, wherein the flow channels comprise multiple non-serpentine flow channels.

26. The gas diffusion layer of claim 19, wherein the flow channels comprise a single serpentine flow channel.

27. The gas diffusion layer of claim 19, wherein the flow channels comprise a single non-serpentine flow channel.

28. A method usable with a fuel cell, comprising:
forming flow channels in a gas diffusion layer for communicating a reactant;
diffusing at least some of the reactant through the gas diffusion layer to a membrane of a fuel cell; and
seating the gas diffusion layer in a plate of the fuel cell.

29. The method of claim 28, further comprising:
using a first surface of the gas diffusion layer to deliver the reactant to the membrane; and
forming the flow channels in a different second surface.

30. The method of claim 28, further comprising:
using a passageway of the plate to communicate the reactant with the flow channels.

31. The assembly of claim 1, wherein the gas diffusion layer comprises:
a diffuser body for diffusing the reactant to a first surface of the gas diffusion layers; and
a second region integral with the diffuser body, the second region including the flow channels.

* * * * *

UNITED STATES PATENT AND TRADEMARK OFFICE
CERTIFICATE OF CORRECTION

PATENT NO. : 6,280,870 B1
DATED : August 28, 2001
INVENTOR(S) : Glenn A. Eisman, William B. Maynard, Ron H. Farkash and Charles M. Carlstrom It is certified that error appears in the above-identified patent and that said Letters Patent is hereby corrected as shown below:

Column 7,
Line 24, after "flow channels", insert -- formed in a surface of the body for --.

Signed and Sealed this

Ninth Day of April, 2002

Attest:

*Attesting Officer*

JAMES E. ROGAN
*Director of the United States Patent and Trademark Office*